United States Patent [19]

Gellert

[11] Patent Number: 5,061,174

[45] Date of Patent: * Oct. 29, 1991

[54] INJECTION MOLDING APPARATUS HAVING SEPARATE HEATING ELEMENT IN THE CAVITY FORMING INSERT

[76] Inventor: Jobst U. Gellert, 7A Prince Street, Georgetown, Ontario, Canada, L7G 2X1

[*] Notice: The portion of the term of this patent subsequent to Sep. 10, 2008 has been disclaimed.

[21] Appl. No.: 635,991

[22] Filed: Dec. 31, 1990

[30] Foreign Application Priority Data

Nov. 19, 1990 [CA] Canada ................................ 2030287

[51] Int. Cl.⁵ ............................................ B29C 45/20
[52] U.S. Cl. ................................ 425/549; 264/328.15; 425/568; 425/570
[58] Field of Search ........................ 425/549, 568, 570; 264/328.15; 392/480; 219/421, 523

[56] References Cited

U.S. PATENT DOCUMENTS

| | | | |
|---|---|---|---|
| 4,622,001 | 11/1986 | Bright et al. | 425/552 |
| 4,688,622 | 8/1987 | Gellert | 164/61 |
| 4,768,945 | 9/1988 | Schmidt et al. | 425/549 |
| 4,875,848 | 10/1989 | Gellert | 425/549 |
| 4,911,636 | 3/1990 | Gellert | 425/549 |
| 4,941,249 | 7/1990 | Gellert | 425/549 |

Primary Examiner—Timothy Heitbrink
Attorney, Agent, or Firm—Dalesman & Company

[57] ABSTRACT

Apparatus for thermal gated injection molding having a cavity forming insert separate from the heated nozzle. The cavity forming insert has a combination of heating and cooling extending around a central melt bore leading to a gate. The cavity forming insert has an integral electric heating element with an inner portion having a number of adjacent coils near the gate. Power to the heating element is switched on and off during the thermal gated cycle, and the combination of heating and cooling in the cavity forming insert improves the thermal response and shortens the cycle time.

1 Claim, 5 Drawing Sheets

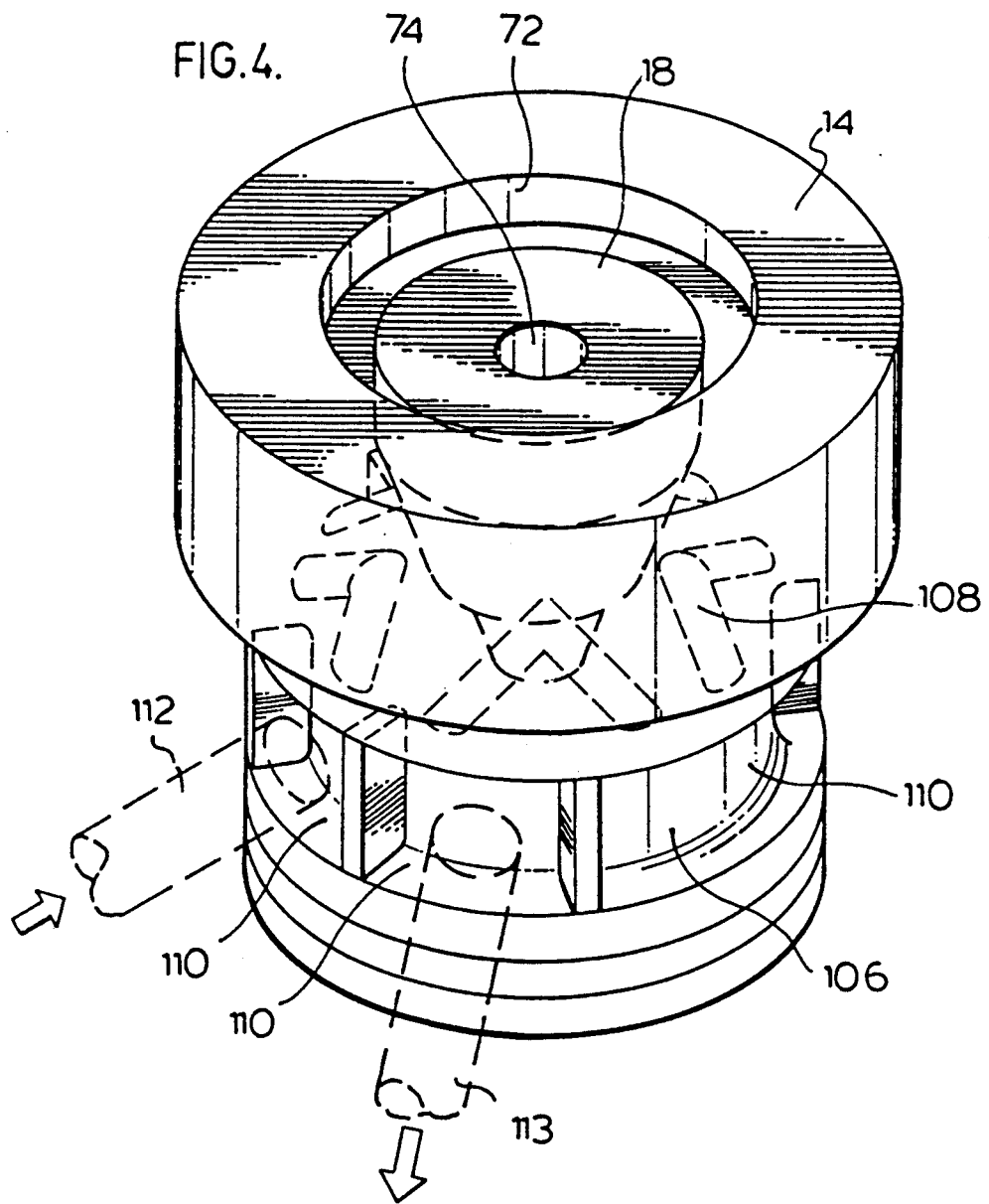

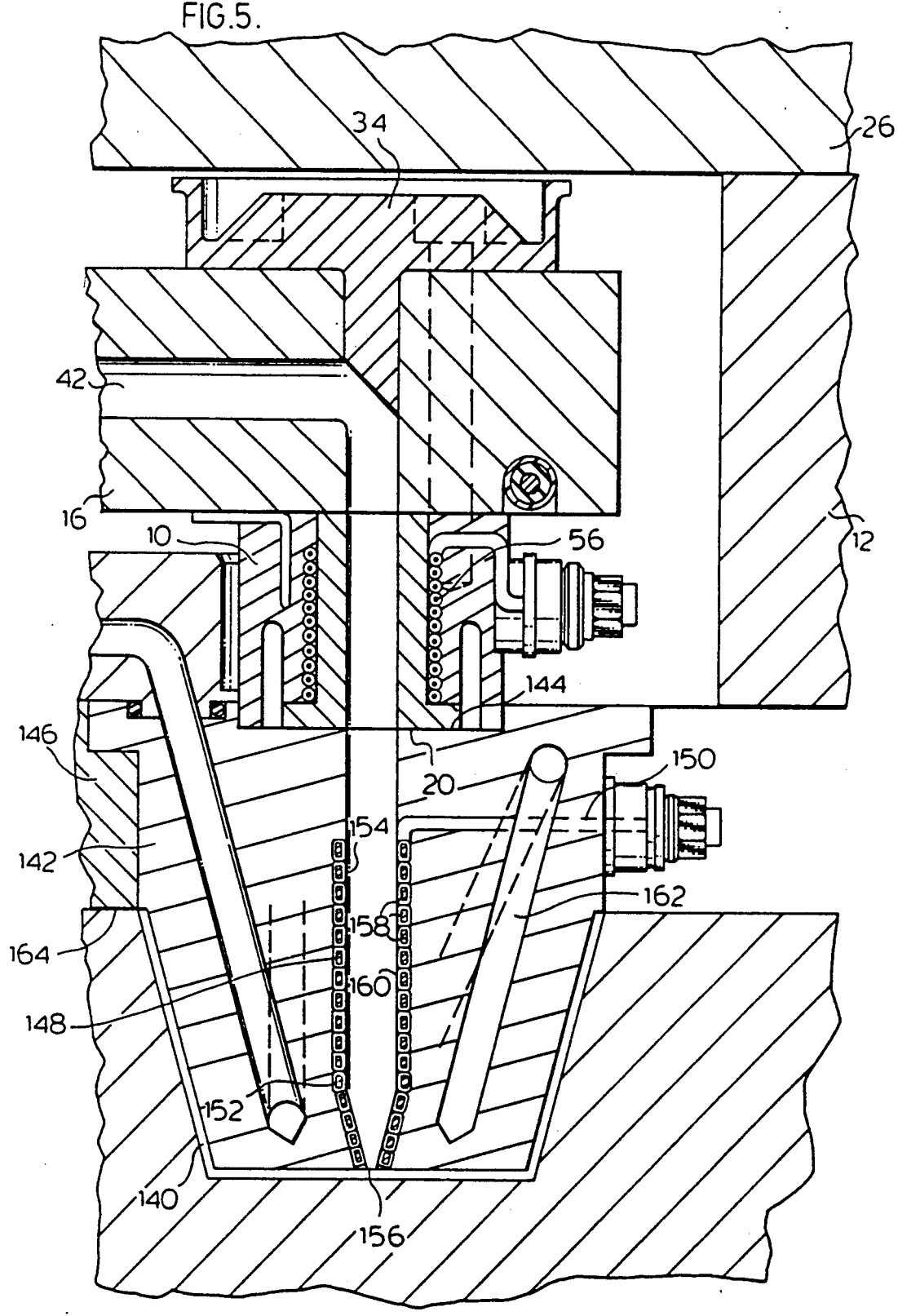

INJECTION MOLDING APPARATUS HAVING SEPARATE HEATING ELEMENT IN THE CAVITY FORMING INSERT

BACKGROUND OF THE INVENTION

This invention relates generally to injection molding and more particularly to thermal gated injection molding apparatus having a cavity forming insert with a combination of heating and cooling extending around a central bore leading to a gate.

For clarification, reference herein to a "cavity forming insert" shall include both a cavity insert as seen in the first embodiment and a core insert as seen in the second embodiment.

Thermal gating which is also referred to as temperature assisted gating involves changing the temperature of the melt in the gate area during each cycle to assist in controlling flow to the cavity. This is known in the art such as in Schmidt U.S. Pat. No. 4,768,945 which issued Sept. 6, 1988 which describes the heating element having a forward portion extending diagonally into a nose portion of the nozzle. In the applicant's U.S. Pat. No. 4,911,636 which issued Mar. 27, 1990 and U.S. Pat. No. 4,941,249 which issued July 17, 1990, thermal gating is described using a nozzle with an integral heating element having a circular portion which encircles the melt bore in a forward nose portion of the nozzle. The applicant's U.S. Pat. No. 4,875,848 which issued Oct. 24, 1989 discloses a tapered gate insert which is mounted in the forward end of a nozzle and is heated by an integral helical heating element.

It is known in the art to use a separate cavity insert rather than a cavity plate in which the nozzle is seated to form the rearward side of the cavity. For instance, the applicant's U.S. Pat. No. 4,911,636 which issued Mar. 27, 1990 show a heated nozzle extending through a support or nozzle plate into a cooled cavity insert. However, the gate and the entire melt passage leading to it are part of the nozzle and all of the heating is provided by the single heating element in the nozzle. Thus, the nozzle must project through the cavity insert to the cavity.

These previous systems have the disadvantage for thermal gating temperature sensitive materials that thermal response is delayed by the cooling being in the cavity insert and the heating in the nozzle.

SUMMARY OF THE INVENTION

Accordingly, it is an object of the present invention to at least partially overcome the disadvantages of the prior art by providing thermal gated injection molding apparatus having a cavity forming insert with a combination of heating and cooling extending around a central bore leading to a gate.

To this end, in one of its aspects, the invention provides an injection molding apparatus to convey pressurized melt from a source to a cavity having a cooled cavity forming insert with a rear end, a heated nozzle with a forward end, the heated nozzle being received in a nozzle plate with the forward end of the heated nozzle abutting against the rear end of the cavity forming insert, the nozzle having at least one melt passage extending therethrough, the improvement wherein; the cavity forming insert has a gate leading to the cavity, a central bore to convey melt from the melt passage in the nozzle to the gate, and an integral electrically insulated heating element, the heating element having an outer terminal portion extending outwardly to an external terminal and an inner portion having a generally uniform rectangular cross section, the inner portion of the heating element having a plurality of adjacent coils which form an inner surface, the heating element being integrally mounted in the cavity forming insert with the inner portion extending around the central bore leading to the gate whereby at least part of the inner surface formed by the adjacent coils of the inner portion of the heating element form a tapered portion of the central bore leading to the gate.

Further objects and advantages will appear from the following description taken together with the accompanying drawings.

BRIEF DESCRIPTION OF THE DRAWINGS

FIG. 4 is a partially cut-away view of the cavity insert seen in FIG. 3 to show the cooling conduit configuration in this embodiment; and FIG. 5 is a sectional view of a portion of an injection molding system showing a core insert according to a second embodiment of the invention

DETAILED DESCRIPTION OF THE INVENTION

Figure 1:
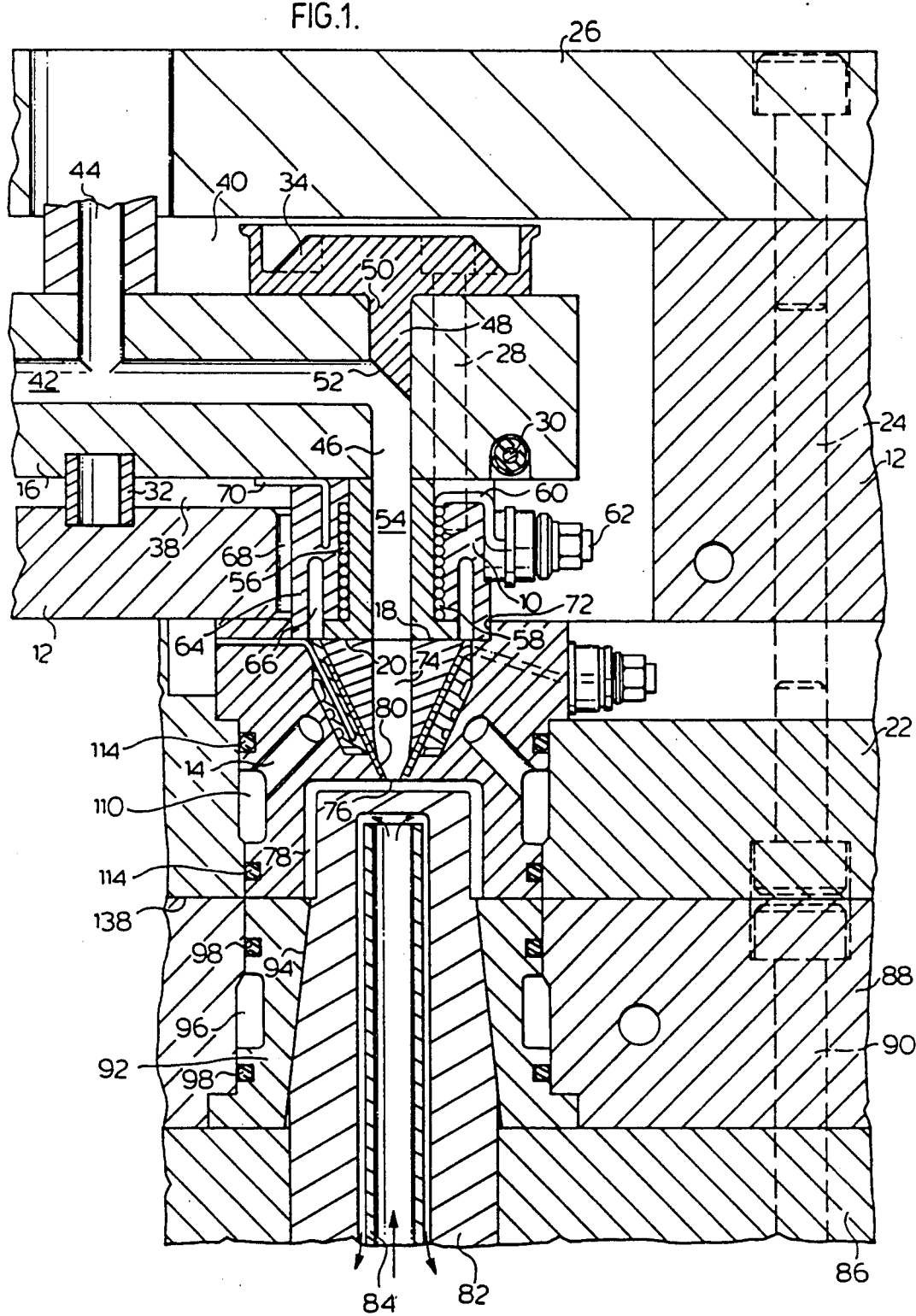
FIG. 1 is a sectional view of a portion of a thermal gated multi-cavity injection molding system or apparatus showing a cavity insert according to a first embodiment of the invention.
Figure 2:
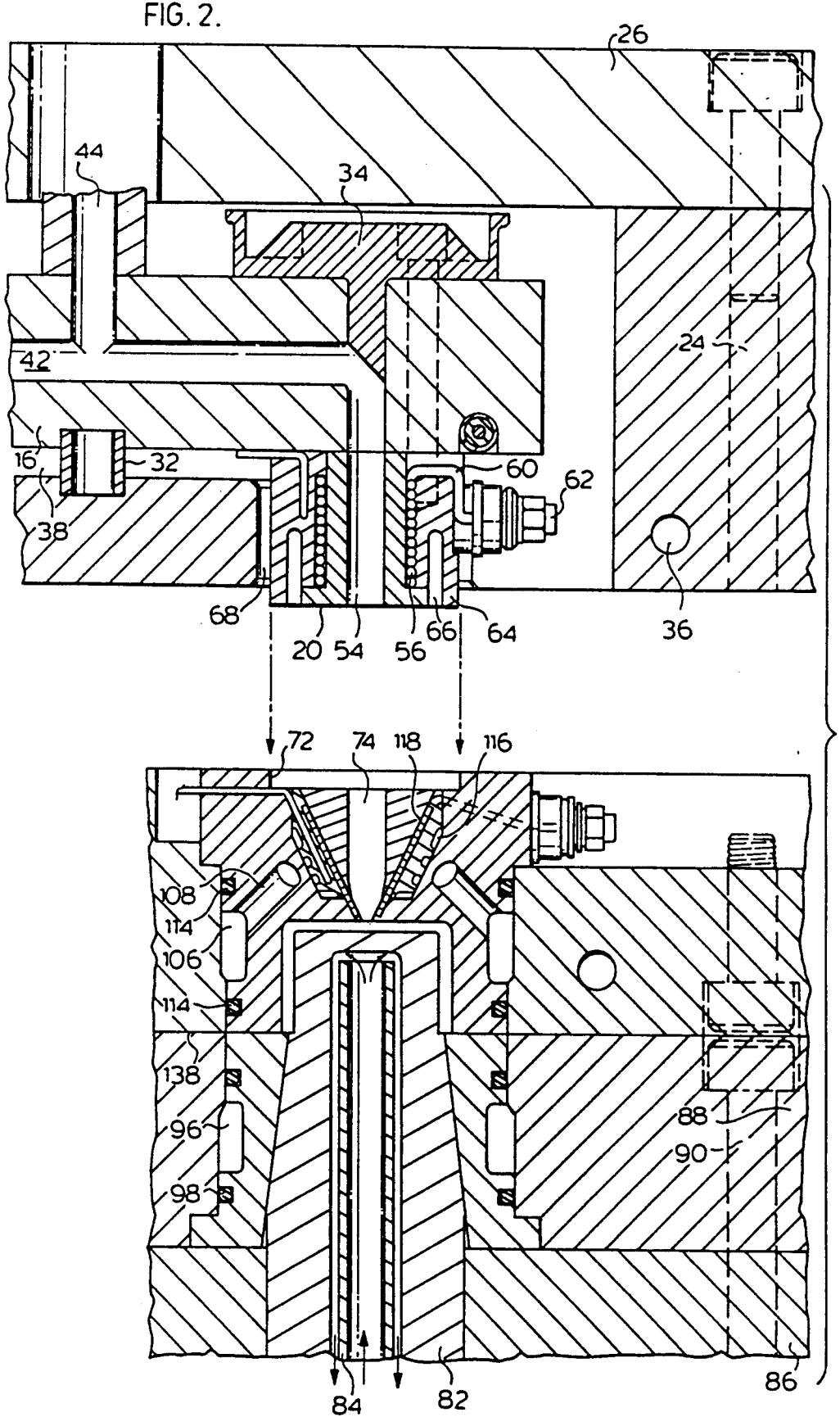
FIG. 2 is a similar view showing the nozzles and cavity insert in the open position.

Reference is a first made to FIGS. 1 and 2 which show a portion of a multi-cavity thermal gated injection molding system having a number of heated nozzles 10, each of which is received in a nozzle plate 12 between a cavity insert 14 and a common elongated manifold 16. As seen in FIG. 1, the cavity insert 14 is secured in position with its rear end 18 abutting against the forward end 20 of the nozzle 10 by a cavity insert retainer plate 22. The cavity insert retainer plate 22 is held by bolts 24 which extend through the nozzle plate 12 to a backplate 26.

Each nozzle 10 is attached by bolts 28 to the manifold 16 which is heated by an electric heating element 30 which is integrally cast into it as described in the applicant's U.S. Pat. No. 4,688,622 which issued Aug. 25, 1987. The manifold 16 is securely located in place between the nozzle plate 12 and the backplate 26 by a central locating ring 32 and a number of spacer rings 34. The nozzle plate 12 and the backplate 26 are cooled by pumping cooling water through cooling conduits 36. The locating ring 32 provides an insulative air space 38 between the heated manifold 16 and the cooled nozzle plate 12. The spacer rings 34 provide another insulative air space 40 between the heated manifold 16 and the cooled backplate 26.

The manifold 16 has a melt passage 42 which branches from a common inlet 44 to a number of outlets 46. Each spacer ring 34 has a stem portion 48 which extends into a hole 50 in the manifold 16. The stem portion 48 has a diagonal face 52 which avoids a sharp corner in the melt passage 42.

In this embodiment, each nozzle 10 has a central melt passage 54 extending therethrough in alignment with one of the outlets 46 from the melt passage 42 in the manifold 16. The nozzle 10 is heated by an integral electrically insulated heating element 56 which has a helical portion 58 which encircles the central melt passage 54 and a terminal portion 60 which extends outwardly to an external terminal 62. The heated nozzle 10 has a circular outer collar portion 64 which forms an air gap 66 extending around the helical portion 58 of the heating element 56 to reduce heat loss to the cavity insert retainer plate 22. An insulative air space 68 is also provide around the nozzle 10 to reduce heat loss to the surrounding nozzle plate 12. Each nozzle 10 also has a thermocouple 70 to monitor the operating temperature adjacent the heating element 56. The nozzle 10 is located by the collar portion 64 being received in a matching circular seat 72 in cavity insert retainer plate 22 so the melt passage 42 through the nozzle 10 is accurately aligned with a central bore 74 which extends through the cavity insert 14. The cavity insert 14 also has a gate 76 leading to a cavity 78, and the central bore 74 has a tapered portion 80 adjacent the gate 76. In other embodiments, a number of melt passages can extend through each nozzle to a bore in the cavity insert 14.

As described in more detail below, the cavity insert 14 and the adjacent core insert 82 are made to form the cavity 78 between them of a described shape and size. The core insert 82 is cooled by cooling water which flows through a central cooling tube 84. The core insert 82 is located by a surrounding core insert retainer plate 86. A stripper ring retaining plate 88 is secured to the core insert retainer plate 86 by bolts 90 to secure a stripper ring 92 around a tapered portion 94 of the core insert 82. A water cooling ring 96 with sealing O-rings 98 extends around between the stripper ring 92 and the stripper ring retaining plate 88. FIG. 2 is a similar view to FIG. 1 showing the apparatus partially assembled to clearly illustrate how the separate nozzle 10 and cavity insert 14 fit together.

Figure 3:
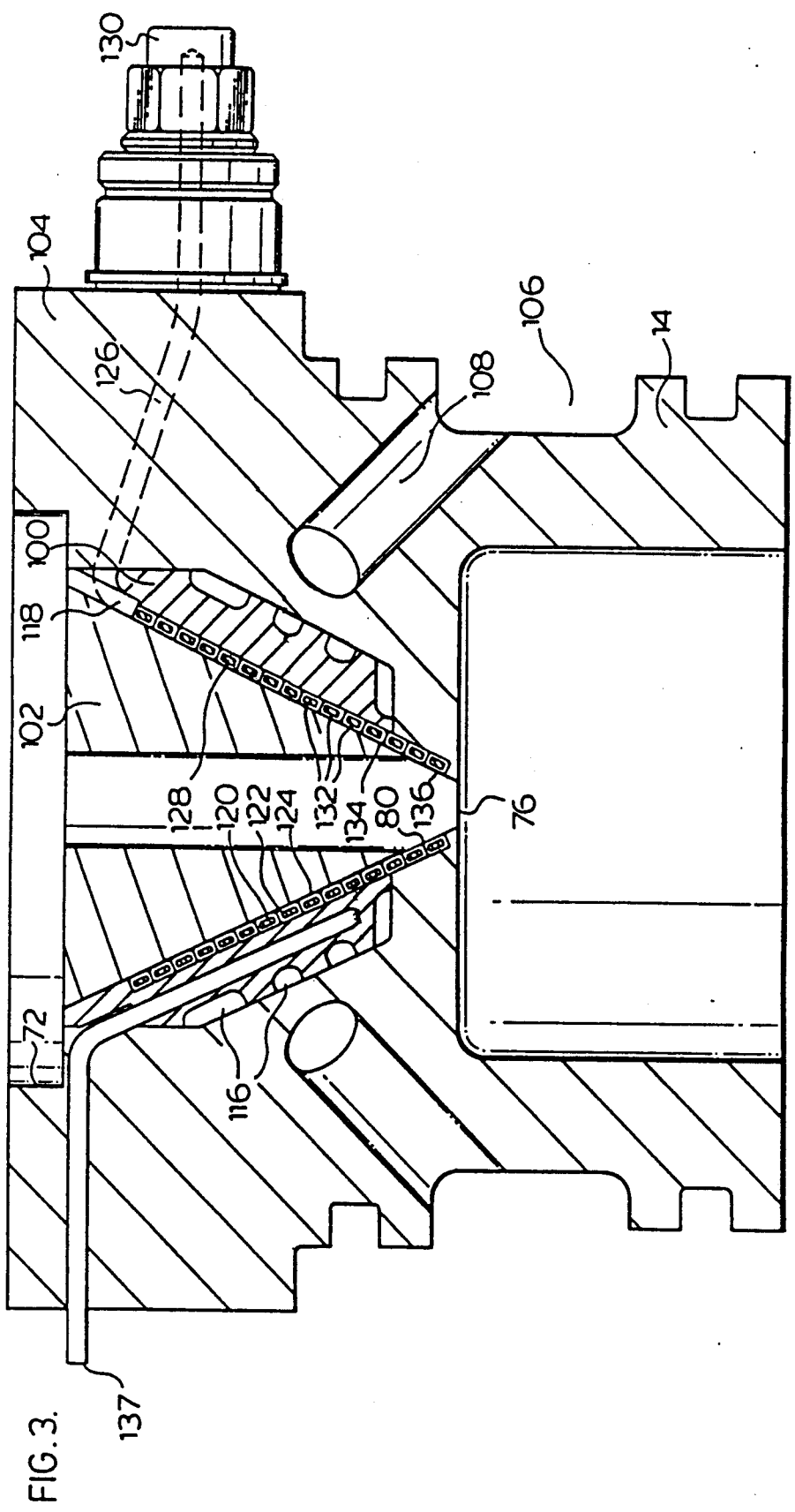
FIG. 3 is an enlarged sectional view of the cavity insert shown in FIGS. 1 and 2.

Reference is now made to FIGS. 3 and 4 to describe the cavity insert 14 in more detail. In this embodiment, it has a generally cylindrical shape with a tapered central portion 100 extending between an inner portion 102 and an outer portion 104, all of which are made of steel. The outer portion 104 is cooled by pumping cooling water through a cooling channel 106 which extends around the tapered central portion 100. The cooling channel 106 has a number of pie-shaped portions 108 which extend inwardly from outer circumferential portions 110, one of which is connected to a cooling water inlet 112 and an adjacent one of which is connected to a cooling water outlet 113. O-rings 114 extend around between the outer portion 104 of the cavity insert 14 and the surrounding cavity insert retainer plate 22 to prevent leakage of the cooling water. The central portion 100 as a number of outer circumferential grooves 116 which provide air insulation between it and the cooled outer portion 104.

The cavity insert 14 also has an electrically insulated heating element 118. In this embodiment, the heating element 118 has a nickel chrome resistant wire 120 extending through a refractory powder electrical insulating material 122, such as magnesium oxide, in a steel casing 124. The heating element 118 has an outer terminal portion 126 which extends outwardly from an inner portion 128 to an external terminal 130. The outer terminal portion 126 has a generally uniform circular cross section, while the inner portion 128 has a generally uniform rectangular cross section. The inner portion 128 of the heating elememt 118 is formed of a number of adjacent coils 132. As described in detail in the applicant's Canadian patent application serial number 2,030,286 filed Nov. 19, 1990 entitled "Injection Molding Nozzle having Tapered Heating Element Adjacent the Bore", the inner portion 128 is made by coiling a portion of a heating element and then compressing it in an opening in a tapered die. Thus, the adjacent coils 132 with the rectangular cross section form a tapered inner surface 134. After the central portion 100 of the cavity insert 14 is inserted into the outer portion 104, the heating element 118 is mounted with its central inner portion 128 between the central and inner portions 100, 102 of the cavity insert 14 and its outer terminal portion 126 extending out through a slot (not shown) in the outer portion 104. The assembly is then brazed together in a vacuum furnace which provides a metallugical bonding of the parts into an integral unit. The central portion 128 of the heating element 118 encircles the central bore 74 leading to the gate 76. In fact, in this embodiment of the invention, the tapered portion 80 of the central bore 74 extending through the cavity insert 14 to the gate 74 is provided by part 136 of the inner surface 134 formed by the tapered adjacent coils 132 of the inner portion 128 of the heating element 118. The cavity insert 14 also has a thermocouple 137 to monitor the operating temperature adjacent the heating element 118.

In use, the system is assembled as shown in FIGS. 1 and 2 and electrical power is applied to the heating element of the manifold 16, the heating elements 56 of the nozzles 10, and the heating elements 118 of the cavity inserts 14 to heat them to a predetermined operating temperature. Pressurized melt is injected from a molding machine (not shown) through the inlet 44 into the melt passage 42 in the manifold 16 according to a predetermined operating cycle. In order to provide thermal or temperature assisted gating, the power to the heating elements 118 of the cavity plates 14 is controlled in conjunction with the melt injection pressure. The pressurized melt flows through the melt channel 42, the melt passages in each nozzle 10 and cavity insert 14, and the gates 76, and fills the cavities 78. After the cavities 78 are filled, the injection pressure is held momentarily to pack and then released. Following a short cooling period, the mold is opened along the parting line 138 to eject the molded products. The power to the heating elements 118 is switched off just before the mold is opened. The heat in the gate and cavity areas is quickly dissipated by the water flowing through the cooling channel 106 and the gates 76 freeze off. Power is reapplied to the heating elements 118 as the mold is closed following ejection. This instantly heats the solidified melt in the gates 76 so they open immediately when melt injection pressure is reapplied. This cycle is repeated continuously as rapidly as several times per minute in some instances. The combination of both the cooling channel 106 and the heating element 118 extending around the tapered bore 74 of the cavity insert 14 improves thermal response and thus reduces cycle time. This is particularly true when part of the inner surface 134 formed by the adjacent coils 132 of the inner portion 128 of the heating element 118 provides the tapered portion 80 of the central bore 74 of the cavity insert 14.

Reference is now made to FIG. 5 to describe a second embodiment of the invention. As many of the elements in this embodiment ar similar to those of the first embodiment, elements common to both embodiments are described and illustrated using the same reference numerals. As can be seen, in this embodiment the cavity 140 has a different shape than the cavity 78 of the first embodiment. Thus, a core insert 142 is required, rather than a cavity insert. As mentioned above, the generic term "cavity forming insert" is used herein to include both a cavity insert 14 as described in the first embodiment and a core insert 142 as described in this embodiment. The core insert 142 is secured in place with its rear end 144 abutting against the forward end 20 of the nozzle 10 by a core insert retainer plate 146 which is secured by bolts (not shown) which extend to the backplate 26.

The core insert 142 has a similar heating element 148 with an outer terminal portion 150 and an inner portion 152 which extends around a central bore 154 leading to a gate 156. The outer terminal portion 150 has a generally uniform circular cross section, whereas the cross section of the inner portion 152 is generally rectangular. As described above, the inner portion 152 of the heating element 148 is formed of a number of adjacent coils 158, which form an inner surface 160. In this embodiment, this inner surface 160 forms most of the central bore 154 through the core insert 142 to provide immediate thermal response for thermal gating. The core insert 142 also has interconnected cooling bores 162 extending around the central bore 154 through which cooling water is pumped to provide cooling.

In use, heating and melt injection pressure are applied according to a predetermined thermal gating cycle similar to that described above, and the mold is opened along parting line 164. The combination of heating and cooling in the core insert 142 again improves thermal response and reduces cycle time.

While the description of the injection molding apparatus having a cavity forming insert 14 with a combination of heating and cooling extending around the central bore 74 has been given with respect to preferred embodiments, it is not to be construed in a limiting sense. Variations will readily occur to those skilled in the art. For instance, it is apparent that the size and shape of the central bore and the size, shape and location of the cooling channel and heating element extending around it can be different for different applications. Reference is made to the appended claims for a definition of the invention.

What I claim is:

1. In an injection molding apparatus to convey pressurized melt from a source to a cavity having a cooled cavity forming insert with a rear end, a heated nozzle with a forward end, the heated nozzle being received in a nozzle plate with the forward end of the heated nozzle abutting against the rear end of the cavity forming insert, the nozzle having at least one melt passage extending therethrough, the improvement wherein;

the cavity forming insert has a gate leading to the cavity, a central bore to convey melt from the melt passage in the nozzle to the gate, and an integral electrically insulated heating element, the heating element having an outer terminal portion extending outwardly to an external terminal and an inner portion having a generally uniform rectangular cross section, the inner portion of the heating element having a plurality of adjacent coils which form an inner surface, the heating element being integrally mounted in the cavity forming insert with the inner portion extending around the central bore leading to the gate whereby at least part of the inner surface formed by the adjacent coils of the inner portion of the heating element form a tapered portion of the central bore leading to the gate.

* * * * *